(12) United States Patent
Moore et al.

(10) Patent No.: US 7,596,739 B2
(45) Date of Patent: Sep. 29, 2009

(54) METHOD AND SYSTEM FOR DATA REPLICATION

(75) Inventors: William H. Moore, Fremont, CA (US); Jeffrey S. Bonwick, Los Altos, CA (US); Matthew A. Ahrens, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 676 days.

(21) Appl. No.: 11/434,296

(22) Filed: May 15, 2006

(65) Prior Publication Data
US 2007/0124659 A1  May 31, 2007

Related U.S. Application Data

(60) Provisional application No. 60/733,848, filed on Nov. 4, 2005.

(51) Int. Cl.
*G11C 29/00* (2006.01)
(52) U.S. Cl. .................. 714/770; 714/758; 714/805
(58) Field of Classification Search .......... 711/114, 711/113; 709/223; 714/6, 770, 758, 805
See application file for complete search history.

(56) References Cited

U.S. PATENT DOCUMENTS

| 4,144,522 | A | 3/1979 | Kageyama et al. |
| 5,129,085 | A | 7/1992 | Yamasaki et al. |
| 5,155,847 | A | 10/1992 | Kirouac et al. |
| 5,274,803 | A | 12/1993 | Dubin et al. |
| 5,371,885 | A | 12/1994 | Letwin |
| 5,403,639 | A | 4/1995 | Belsan et al. |
| 5,410,667 | A | 4/1995 | Belsan et al. |
| 5,675,802 | A | 10/1997 | Allen et al. |
| 5,819,292 | A | 10/1998 | Hitz et al. |
| 6,012,063 | A | 1/2000 | Bodnar |
| 6,209,111 | B1 | 3/2001 | Kadyk et al. |
| 6,341,341 | B1 | 1/2002 | Grummon et al. |
| 6,536,033 | B1 | 3/2003 | Weerawarana et al. |
| 6,591,339 | B1 * | 7/2003 | Horst et al. .................. 711/114 |
| 6,745,284 | B1 | 6/2004 | Lee et al. |
| 6,745,305 | B2 | 6/2004 | McDowell |
| 6,795,966 | B1 | 9/2004 | Lim et al. |
| 6,820,098 | B1 | 11/2004 | Ganesh et al. |

(Continued)

OTHER PUBLICATIONS

Sandberg, R. et al.; "Design and Implementation of the Sun Network Filesystem"; Sun Microsystems, Inc., 1985 USENIX Conference (12 pages).

(Continued)

*Primary Examiner*—David Ton
(74) *Attorney, Agent, or Firm*—Osha • Liang LLP

(57) ABSTRACT

A method for writing data to a storage pool includes receiving a write operation to write a logical block of data to the storage pool, determining a number (n−1) of physical blocks required to store the logical block of data, generating a parity block using the logical block of data, allocating n physical blocks in the storage pool, writing the parity block in the first of n allocated physical block, and writing the logical block of data across the remaining n−1 allocated physical blocks, where n is less than a number of disks in the storage pool, and where each of the n allocated physical blocks is located on a different disk in the storage pool.

12 Claims, 9 Drawing Sheets

U.S. PATENT DOCUMENTS

| | | | |
|---|---|---|---|
| 6,829,617 | B2 | 12/2004 | Sawdon et al. |
| 6,851,082 | B1 | 2/2005 | Corbett |
| 6,857,001 | B2 | 2/2005 | Hitz et al. |
| 6,862,692 | B2* | 3/2005 | Ulrich et al. ............... 714/6 |
| 6,892,211 | B2 | 5/2005 | Hitz et al. |
| 7,007,196 | B2 | 2/2006 | Lee et al. |
| 7,032,154 | B2 | 4/2006 | Kidorf et al. |
| 7,039,611 | B2 | 5/2006 | Devine |
| 7,039,661 | B1 | 5/2006 | Ranade et al. |
| 7,043,677 | B1 | 5/2006 | Li |
| 7,054,927 | B2* | 5/2006 | Ulrich et al. ............ 709/223 |
| 7,133,964 | B2 | 11/2006 | Rodrigues et al. |
| 7,162,486 | B2 | 1/2007 | Patel et al. |
| 7,174,352 | B2 | 2/2007 | Kleiman et al. |
| 7,200,715 | B2 | 4/2007 | Kleiman et al. |
| 7,281,089 | B2* | 10/2007 | Thompson et al. ......... 711/114 |
| 7,340,640 | B1 | 3/2008 | Karr et al. |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0124137 | A1* | 9/2002 | Ulrich et al. ............ 711/113 |
| 2002/0161972 | A1 | 10/2002 | Talagala et al. |
| 2003/0033477 | A1 | 2/2003 | Johnson et al. |
| 2003/0084242 | A1 | 5/2003 | Strange et al. |
| 2003/0126107 | A1 | 7/2003 | Yamagami |
| 2003/0145167 | A1* | 7/2003 | Tomita ................. 711/114 |
| 2004/0024973 | A1 | 2/2004 | Chron et al. |
| 2004/0030822 | A1 | 2/2004 | Rajan et al. |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0143713 | A1 | 7/2004 | Niles et al. |
| 2004/0225834 | A1 | 11/2004 | Lu et al. |
| 2004/0234000 | A1 | 11/2004 | Page |
| 2004/0268068 | A1 | 12/2004 | Curran et al. |
| 2005/0010620 | A1 | 1/2005 | Silvers et al. |
| 2005/0097270 | A1 | 5/2005 | Kleiman et al. |
| 2005/0235154 | A1 | 10/2005 | Serret-Avila |
| 2006/0168409 | A1 | 7/2006 | Kahn et al. |
| 2006/0218644 | A1 | 9/2006 | Niles et al. |
| 2006/0256965 | A1 | 11/2006 | Rowe |
| 2007/0180298 | A1* | 8/2007 | Byrne et al. ............... 714/6 |
| 2008/0126704 | A1* | 5/2008 | Ulrich et al. ............ 711/114 |

OTHER PUBLICATIONS

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec, 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Austin, B.; "*A Dynamic Disc Allocation Algorithm Designed to Reduce Fragmentation During File Reloading*"; Information Sciences Laboratory, Corporate Research and Development Center, General Electric Company, 1970; pp. 378-381 (4 pages).

Goodheart, B. et al.; "*The Magic Garden Explained*", Prentice Hall, 1994; pp. 24-25, 29-30, 390-391 (8 pages).

Stallings, W.; "*Computer Organization and Architecture: Designing for Performance*"; Prentice Hall, Fifth Edition, 2000; pp. 377-378 (4 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M. L.; "File System Performance and Transaction Support"; University of California at Berkeley, 1992 (131 pages).

Octavian Lascu et al, "Configuration and Tunin GPFS for Digital Media Environments", Nov. 2005, IBM International Technical Support Organization, p. 38. Available online: http://www.redbooks.ibm.com/redbooks/pdfs/sg246700.pdf.

"An Introduction to GPFS v1.3 for Linux", Jun. 2003. Available online: http://jumpdoc.fz-juelich.de/doc_pdf/gpfs21/GPFs-Linux-wp060303.pdf.

Sanjay Ghemawat et al, "The Google File System", 2003, ACM, p. 3.

* cited by examiner

METHOD AND SYSTEM FOR DATA REPLICATION

CROSS REFERENCE TO RELATED APPLICATIONS

This application claims benefit of U.S. Provisional Application Ser. No. 60/733,848 filed on Nov. 4, 2005, entitled "Multiple Replication Levels with Pooled Devices" in the names of William H. Moore, Jeffrey S. Bonwick, and Matthew A. Ahrens.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828, 715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853, 837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Automatic Conversion of All-Zero Data Storage Blocks into File Holes" (application Ser. No. 10/853, 915) filed on May 26, 2004; "Multiple Replication Levels with Pooled Devices" (Application Ser. No. 60/733,848) filed on Nov. 4, 2005; "Multiple Replication Levels with Pooled Devices" Application Ser. No. 11/406,956 filed on Apr. 19, 2006; "Method and System Supporting Per-File and Per-Block Replication" Application Ser. No. 11/406,850 filed on Apr. 19, 2006; "Ditto Blocks" Application Ser. No. 11/406, 590 filed on Apr. 19, 2006; and "Method and System for Adaptive Metadata Replication" Application Ser. No. 11/406, 957.

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

Data stored as files in a file system may be replicated using one or more replication schemes. Replication schemes are typically used to enable recover data in the event of file system failures, data corruption, etc. Data replication ensures continuous availability and protection of data stored on disk. The follow is a non-exclusive list of common replication schemes: redundant arrays of independent disks (RAID) schemes, 2-way mirroring, 3-way mirroring, etc. Typically, the level of granularity available for replication of data is a file.

There are many RAID schemes currently available. One common RAID scheme is RAID-5. In general, RAID-5 is used to replicate data across multiple physical disks organized in an array. More specifically, the physical disks in the data storage system are typically segmented into blocks of data space. A block may comprise any appropriate number of bytes of data (e.g., 512 bytes, 1024 bytes, etc.). In RAID-5, data to be stored is divided into data blocks and the resulting data blocks are XORed to obtain a parity block. The parity block corresponds to a block that is used to recover part of the data in the event that one of the aforementioned data blocks is corrupted or the disk, upon which the data block is stored, fails. The data blocks and the parity block are then written to the multiple disks by striping the data blocks across the multiple disks.

The following is a brief example, illustrating the operation of RAID-5. Initially, a request is received to write data to the disk. Assuming that there are five disks in the system, the data to be written is divided into data blocks. Further, one parity block is be created for each set of four data blocks. The four data blocks and the parity block correspond to a stripe. Once all the parity blocks have been created, the data blocks and the corresponding parity blocks are written to disk, in stripes, where each stripe spans the entire five disks and includes four data blocks and one parity block.

In the event that an entire stripe is not written to the disks (i.e., one or more data blocks or the corresponding parity block is not written to disk), then the parity block of the stripe will be inconsistent with the data blocks in the stripe. As a result, the data blocks in the stripe cannot be recovered using the parity block. The aforementioned issue, commonly known as a "write-hole," has been addressed using hardware based solutions.

Continuing with the discussion of RAID schemes, to modify data already written to disk using RAID-5 replication, the old data block that is to be modified is XORed with the corresponding old parity block to obtain a delta block. The delta block is subsequently XORed with the old parity block to obtain a new parity block. Then, the new data block and the new parity block are written to disk. The aforementioned sequence generates two read operations (i.e., one read operation to read the old data block and one read operation to read the old parity block) and two write operations (i.e., one write operation to write the new data block and one write operation to write the new parity block).

In some instances, because the delta blocks are generated using only one of the data blocks striped across the multiple disks rather than all of the data blocks that correspond to the parity block, if one of the two write operations fails and either the new data block or the new parity block does not get written to a disk, then the modified data is not recoverable.

SUMMARY

In general, in one aspect, the invention relates to a method for writing data to a storage pool, comprising receiving a write operation to write a logical block of data to the storage pool, determining a number (n−1) of physical blocks required to store the logical block of data, generating a parity block using the logical block of data, allocating n physical blocks in the storage pool, writing the parity block in the first of n allocated physical block, and writing the logical block of data across the remaining n−1 allocated physical blocks, wherein n is less than a number of disks in the storage pool, and wherein each of the n allocated physical blocks is located on a different disk in the storage pool.

In general, in one aspect, the invention relates to a method for writing data to a storage pool, comprising receiving a write operation to write a logical block of data to the storage pool, determining a number (n) of physical blocks required to store the logical block of data, dividing the logical block of data into n blocks, generating a first parity block using d−1 blocks, wherein d corresponds to a number of disks in the storage pool, generating a second parity block using n−d+1 blocks, wherein the n−d+1 blocks were not used to generate the first parity block, allocating n+2 physical blocks in the storage pool, writing the first parity block and the second parity block to a first of d disks in the storage pool, and writing the n blocks across the remaining d−1 in the storage pool, wherein at most two of the n blocks is written to any of the d−1 disks in the storage pool, and wherein d is less than n+2.

In general, in one aspect, the invention relates to a system, comprising a storage pool comprising a number of disks (d), a file system comprising functionality to receive a write operation to write a logical block of data to the storage pool, determine a number (n−1) of physical blocks required to store the logical block of data, generate a parity block using the logical block of data, allocate n physical blocks in the storage pool, write the parity block in the first of n allocated physical block, and write the logical block of data across the remaining n−1 allocated physical blocks, wherein n is less than d, and wherein each of the n allocated physical blocks is located on a different disk in the storage pool.

In general, in one aspect, the invention relates to a system, comprising a storage pool comprising a number of disks (d), and a file system comprising functionality to receive a write operation to write a logical block of data to the storage pool, determine a number (n) of physical blocks required to store the logical block of data, divide the logical block of data into n blocks, generate a first parity block using d−1 blocks, generate a second parity block using n−d+1 block, wherein the n−d+1 blocks were not used to generate the first parity block, allocate n+2 physical blocks in the storage pool, write the first parity block and the second parity block to a first of d disks in the storage pool, and write the n blocks across the remaining d−1 in the storage pool, wherein at most two of the n blocks is written to any of the d−1 disks in the storage pool, and wherein d is less than n+2.

Other aspects of the invention will be apparent from the following description and the appended claims.

DETAILED DESCRIPTION

Figure 1:
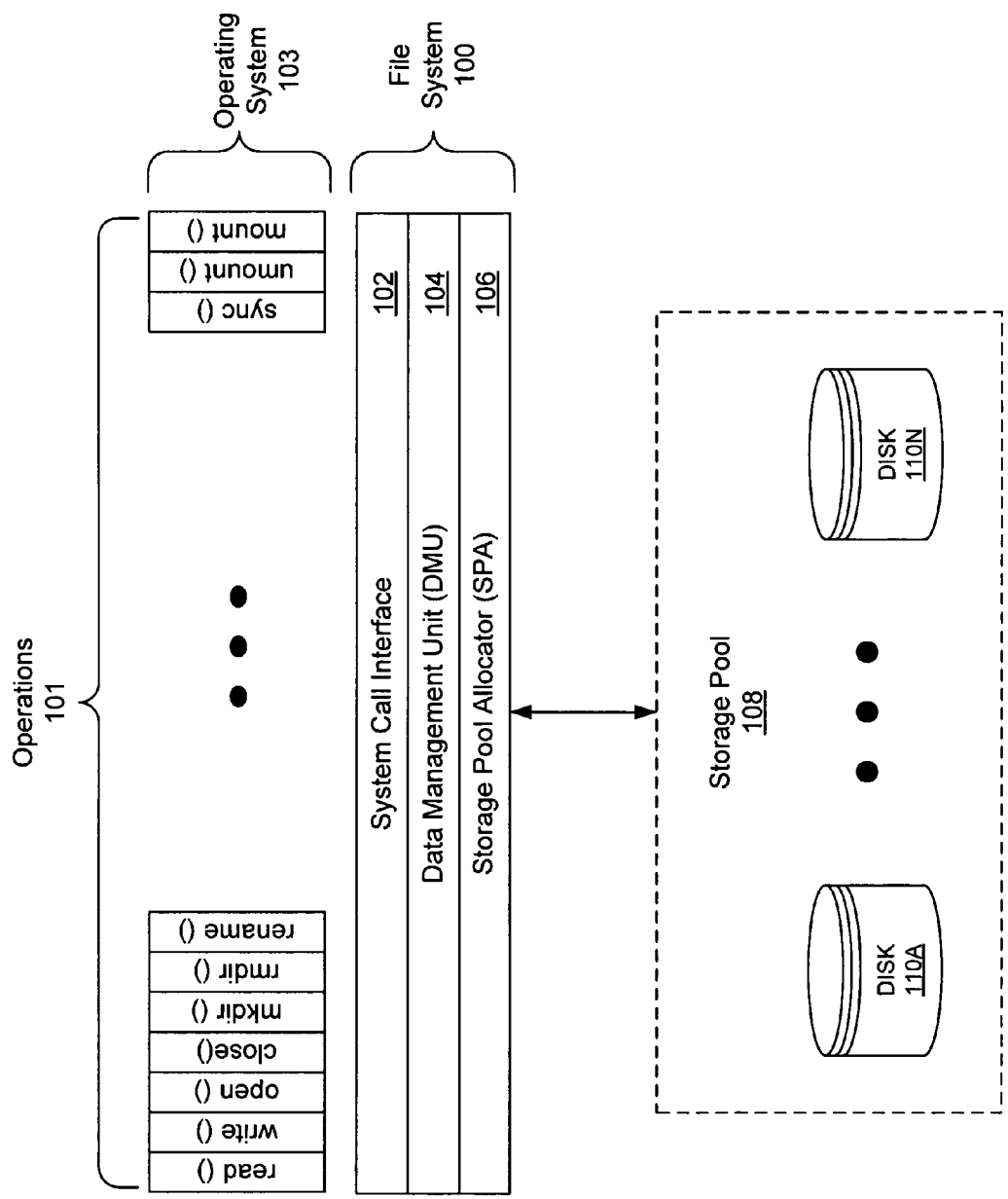
FIG. 1 shows a system architecture in accordance with an embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for replicating data. More specifically, embodiments of the invention relate to a method and apparatus for replication data using a modified RAID scheme.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
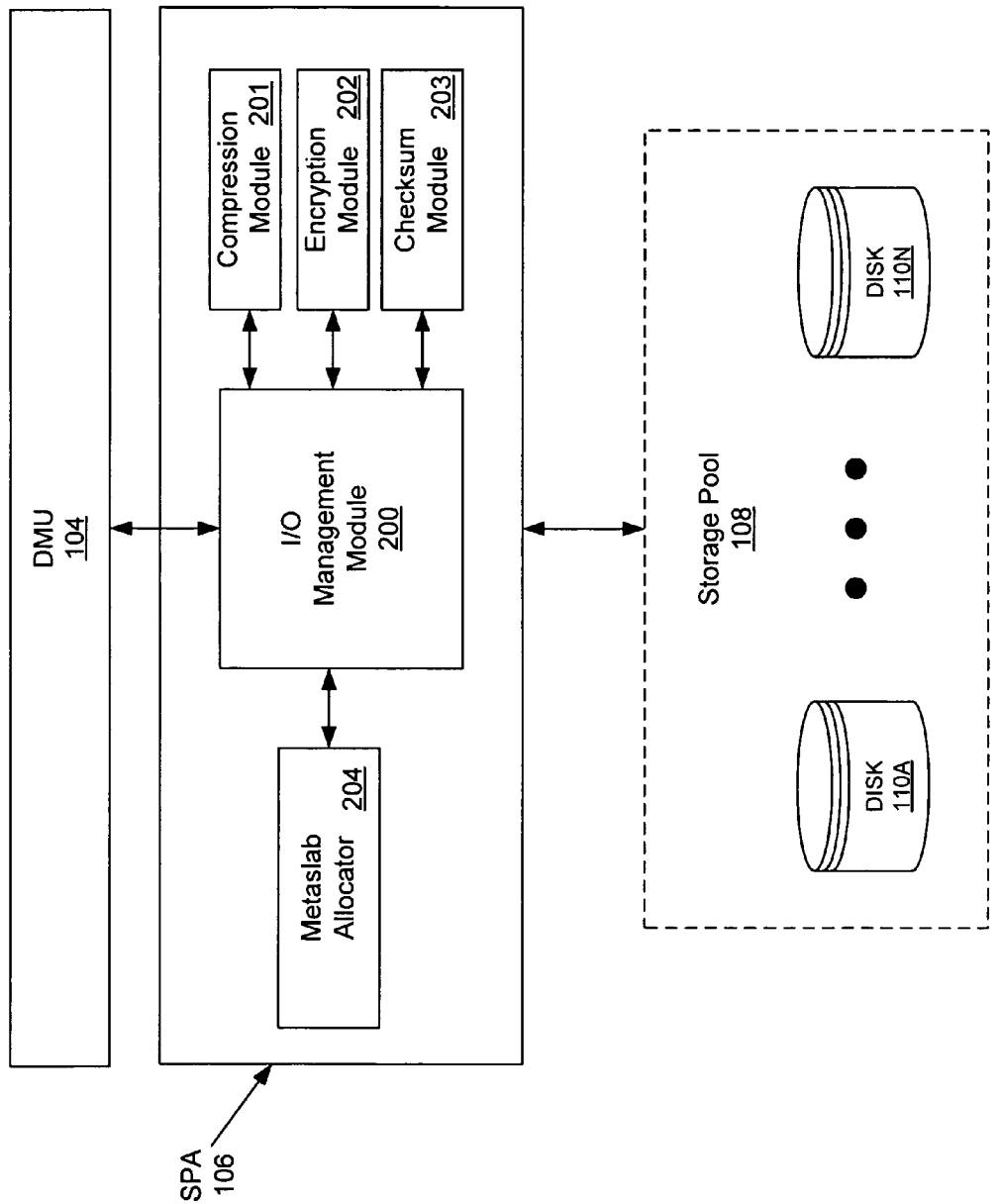
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules are described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8 K bytes may be compressed to a size of 2 K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3:
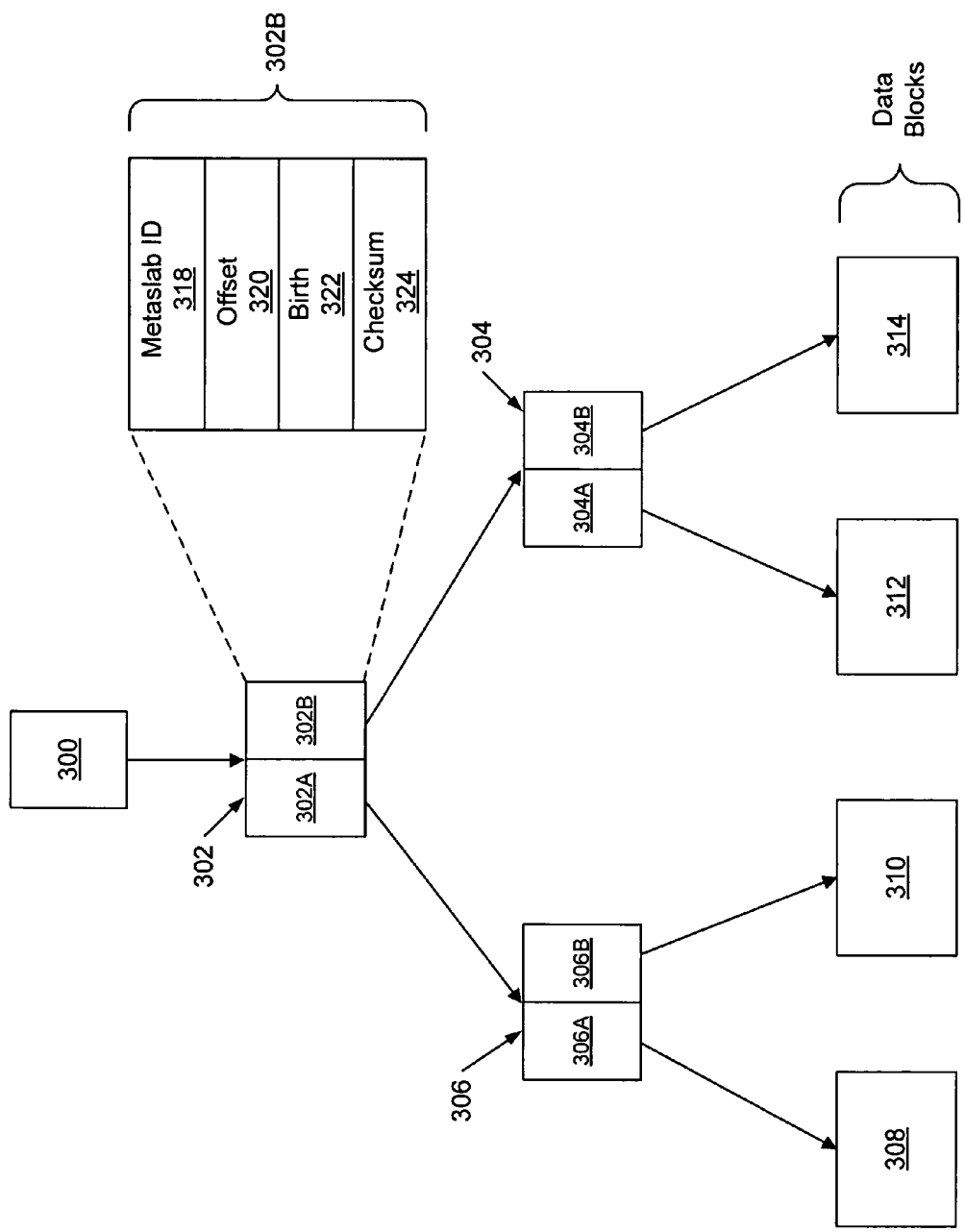
FIG. 3 shows a hierarchical data configuration in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
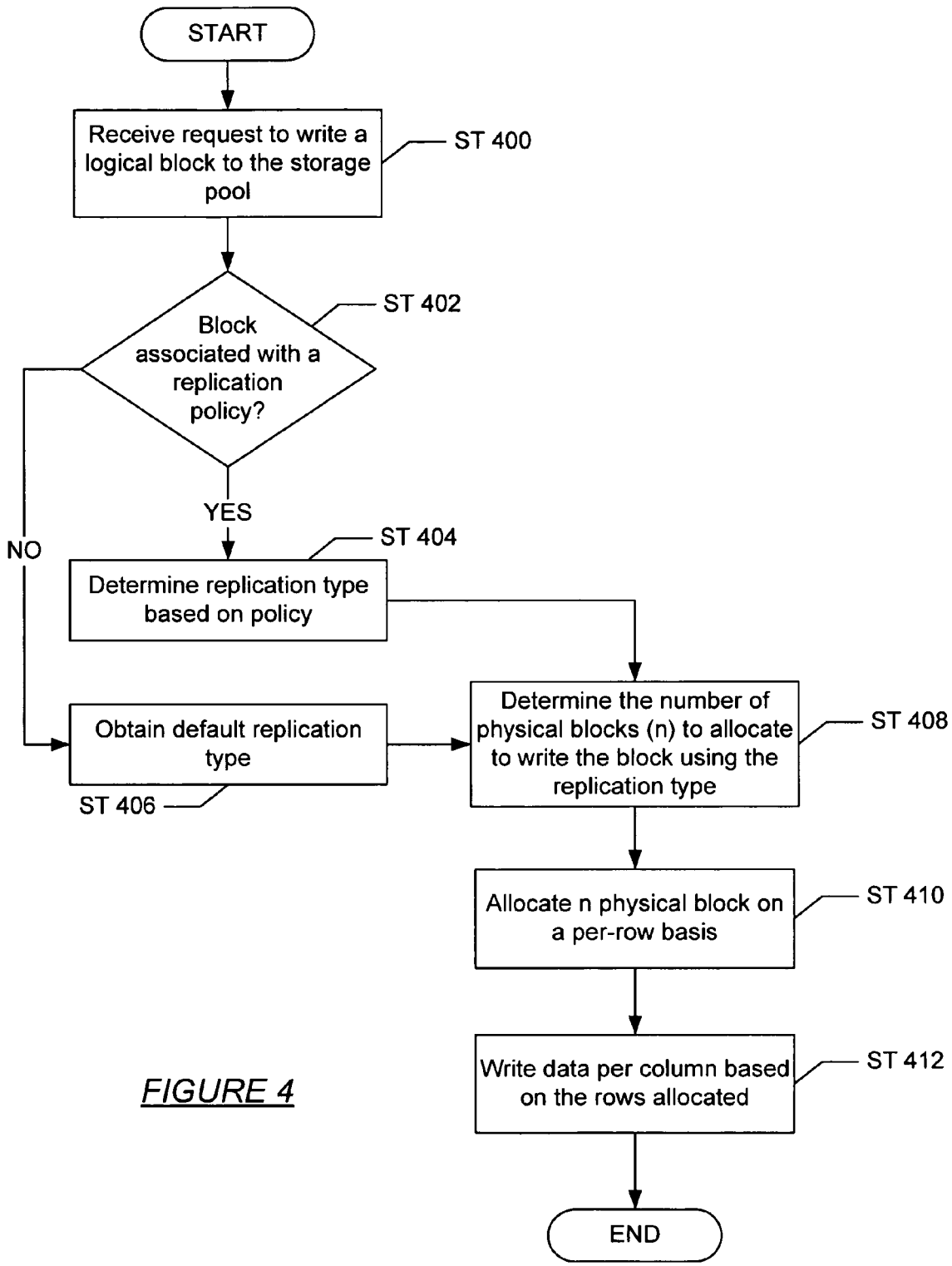
FIGS. 4-6 show flow charts in accordance with an embodiment of the invention.

Using the infrastructure shown in FIGS. 1-3, the following discussion describes a method for writing metadata (i.e., indirect blocks) based on a replication scheme. Specifically, embodiments of the invention are directed towards replication of data and metadata. FIG. 4 shows a flow chart for writing a logical block (e.g., a data block or a block containing, among other information, metadata) to the storage pool in accordance with one embodiment of the invention. Those skilled in the art will appreciate that the logical block is typically larger than the physical blocks. Initially, a request to write the logical block to the storage pool is received (Step 400). A determination is then made about whether the logical block is associated with a replication policy (Step 402). For example, the logical block may be associated with a block level replication policy, a file level replication policy, or a file system level replication policy.

In one embodiment of the invention, the block level policy corresponds to a replication policy with a granularity of a block. Thus, the policy specifies how a block is to be replicated. In one embodiment of the invention, a file level policy corresponds to a replication policy with a granularity of a file. Thus, all blocks that are associated with a given file are replicated in accordance with the file's replication policy. In one embodiment of the invention, the file system policy corresponds to a replication policy with a granularity of a file system. Thus, all files within the file system are replicated in accordance with the file system's policy.

Continuing with the discussion of FIG. 4, if the block is associated with a replication policy, then the replication type (e.g., mirroring, RAID, etc.) is obtained from the replication policy (Step 404). Alternatively, if a replication policy for the logical block does not exist, then a default replication type is determined (Step 406). Once the replication type is determined (using Step 404 or Step 406), the process proceeds to Step 408.

At Step 408, the number of physical blocks that need to be allocated in the storage pool is determined using, among other information, the replication type (Step 408). The steps involved in determining the number of physical blocks to allocated on disk is discussed below in FIG. 5. Once the number of physical blocks to allocate the number of physical blocks is allocated in the storage pool on a per-row basis (Step 410).

For example, if there are five disks in the storage pool and eight physical blocks need to be allocated, then two rows are required. The first row includes five of the eight physical blocks and the second row includes the remaining three physical blocks. In one embodiment of the invention, the logical block (or more specifically the data in the logical block) is written into the allocated physical blocks column-first (Step 412). That is, although physical blocks are allocated using rows, the rows are filled in on a per-column basis when the logical block is written to disk. Using the eight block example from above, physical blocks in the first three columns are written to prior to writing to the remaining physical blocks in columns 4 and 5.

In one embodiment of the invention, the method described above in FIG. 4 allows per-file, per-block replication. That is, embodiments of the invention allow for greater control over how each block written to disk is replicated. For example, each block written to disk can be replicated in a different manner than the previous block or the next block written to disk. Alternatively, all the blocks corresponding to one file may be written using the same replication type. In addition, metadata and data blocks can be written using different replication types, depending on the importance of the data in each block. In one embodiment of the invention, the replication type for each block (data or metadata) is stored in a block pointer (either associated with an indirect block or a root block) referencing the block. Thus, by reading the block pointer referencing a block (where the referenced block may be an indirect block or a data block), the replication type and the starting address of the block can be obtained.

The aforementioned functionality to perform per-file, per-block replication allows users to specify the granularity of the replication policies implemented by the system. For example, the user may be able to specify per-file system, per-file, or per-block replication policies.

Further, per-file, per-block replication permits a simple and easy method for changing replication policies. More specifically, if the replication policy is changed on-the-fly, then the user/administrator gives the file system a command indicating that the replication policy has changed, and any new data that is written to disk is written using the new replication policy. Said another way, using the copy-on-write feature of the present invention, any new blocks written to disk may be written using the new replication policy, without affecting old data already written to disk using a different replication policy. Further, In one embodiment of the invention, per-file, per-block replication permits replication of a class of data at a higher standard than the rest of the data.

Figure 5:
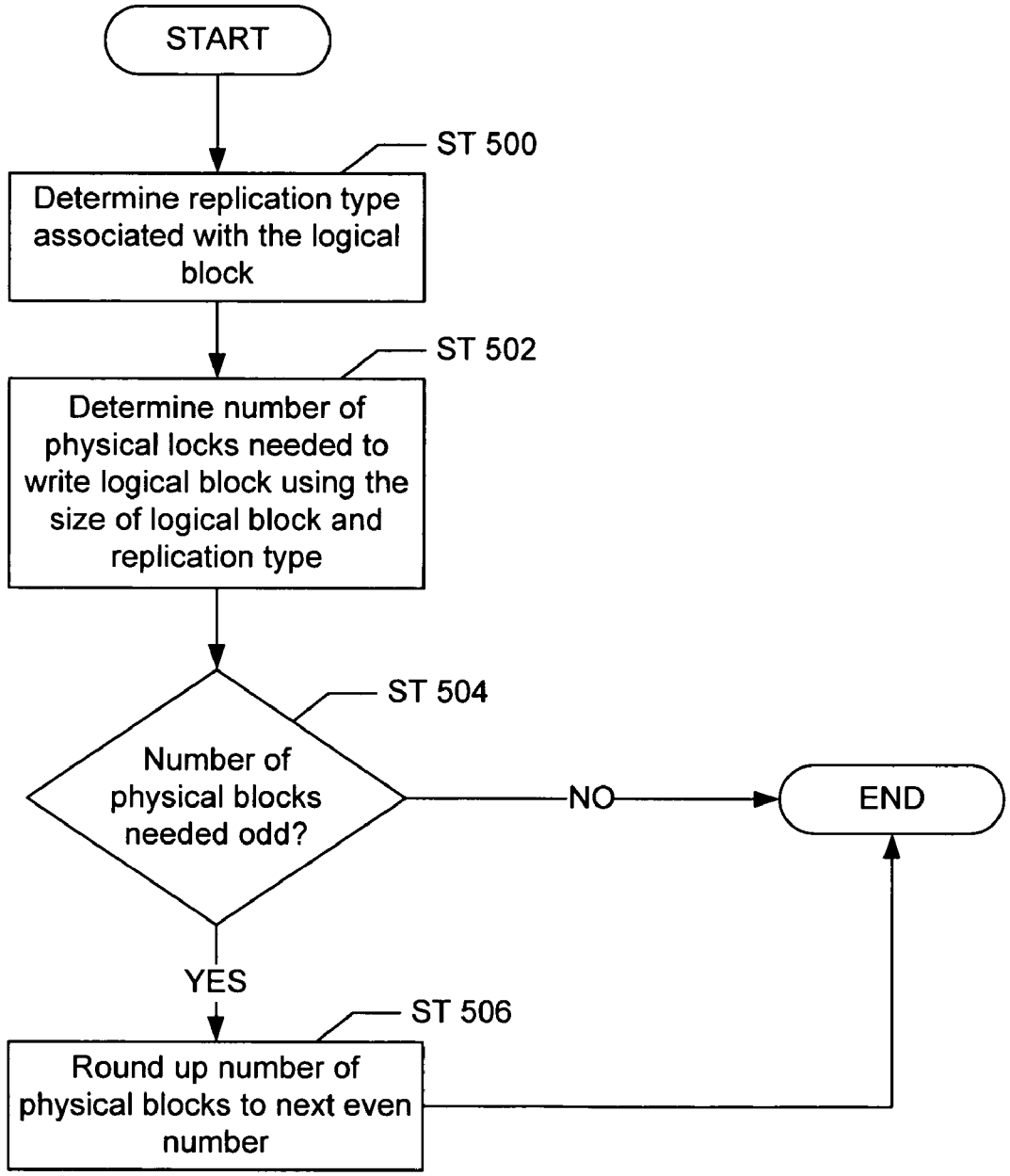

FIG. 5 shows a flow chart showing a method for allocating blocks on disk in accordance with one embodiment of the invention. Specifically, FIG. 5 describes the method corresponding to Step 410 of FIG. 4 in accordance with one embodiment of the invention. Initially, the replication type for the logical block is determined using the replication policy (Step 500). Subsequently, the number of blocks needed to write the logical data to disk is computed using the size of the logical block and the replication type (Step 502). In one embodiment of the invention, the size of logical data corresponds to the number of physical blocks required to write the logical block to disk. In one embodiment of the invention, a single logical block may correspond to more than one physical block (e.g., data block (314) in FIG. 3 may correspond to 1K of data, in which case the single logical block (314) is actually two physical blocks on disk assuming that each individual physical block is 512 bytes).

In one embodiment of the invention, the number of blocks to allocate is computed as a function of the physical size of the data and the replication type used to write the logical block to disk. For example, if the logical block is to be written to disk using a RAID scheme, then the number of physical blocks to allocate is determined by summing the number of physical blocks required to write the logical block into the storage pool and an appropriate number of parity blocks (i.e., physical blocks used to store parity data associated with one or more of the physical blocks). Alternatively, if the size of the logical block is 2K and the replication type is three-way mirroring, then twelve physical blocks would be allocated in the storage pool. Those skilled in the art will appreciate that some logical blocks in the storage pool may not be replicated, in which case physical blocks allocated on disk would correspond directly to the size of the logical block.

At this stage, the number of physical blocks that need to be allocated has been determined, however, the number of physical blocks that need to be allocated may need to be increased to prevent (or mitigate) fragmentation in file system. To determine if the number of physical blocks that need to be allocated is sufficient, a determination is made whether the number of blocks computed is odd (Step 504). If the number of blocks computed is odd, then the number of blocks to allocate is rounded up to the next even number (Step 506). In one embodiment of the invention, the number of blocks allocated is rounded up to an even number to prevent fragmentation. That is, because most replication types require at least two physical blocks, fragmentation of data (i.e., where contiguous physical blocks of data are not allocated for logical blocks) is prevented by restricting the allocation size to even numbers. Alternatively, if the number of blocks computed is even, then the allocated blocks are used to write the data to disk as described above in FIG. 4.

Figure 6:
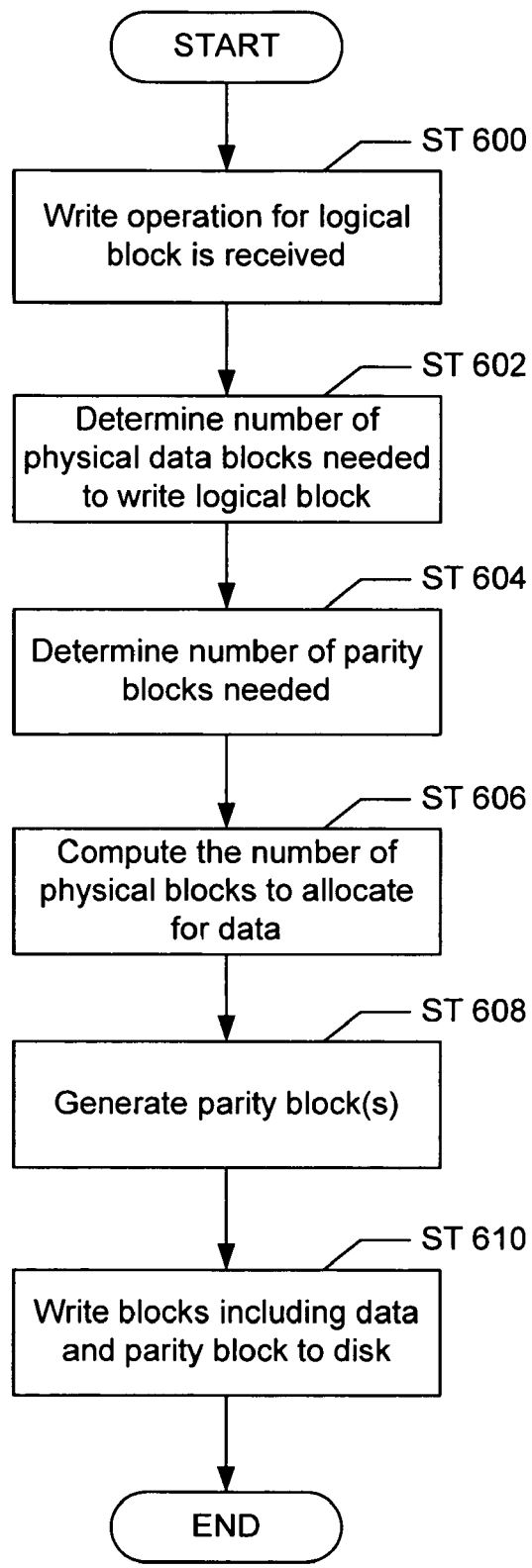
Figure 7:
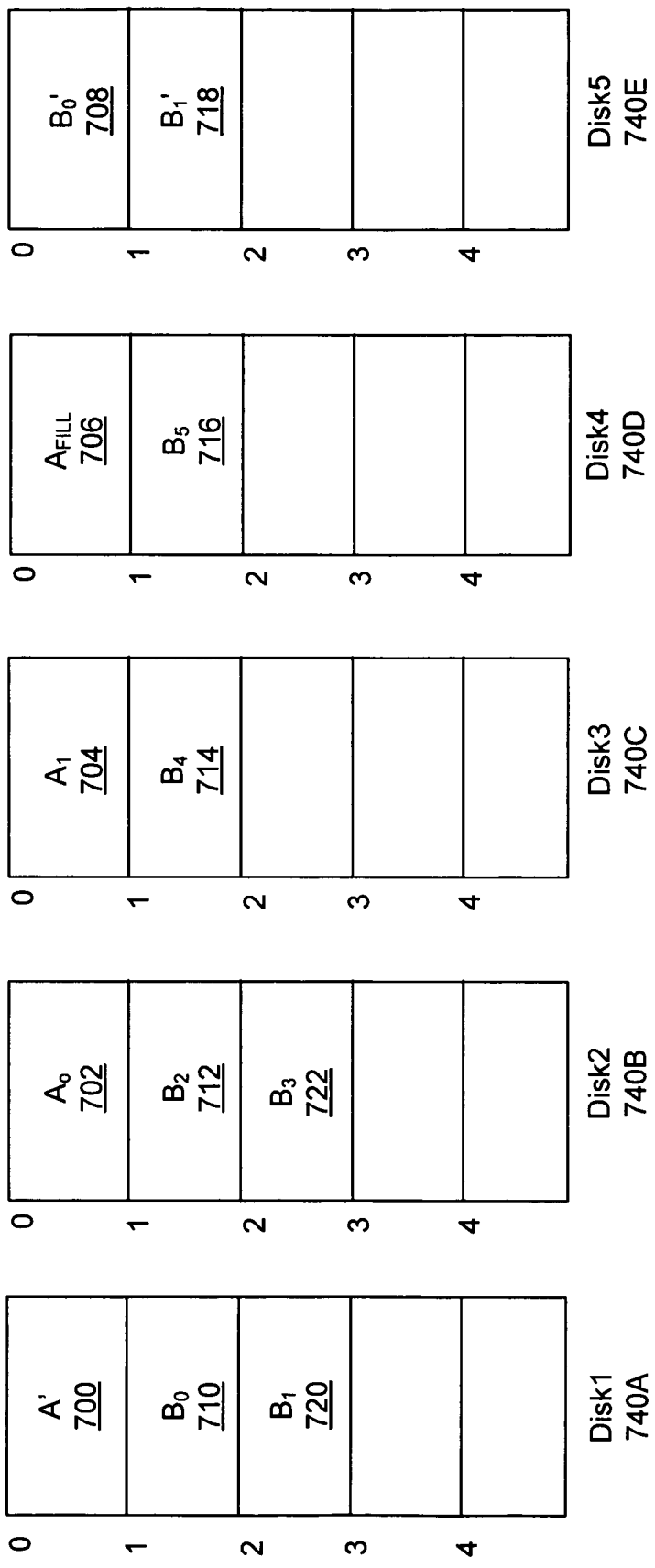
FIG. 7 shows an example of replication of data in accordance with an embodiment of the invention.

FIG. 6 shows flow chart for replicating data using a modified RAID scheme in accordance with one embodiment of the invention. Initially, a write operation is received to write a logical block to disk (Step 600). Subsequently, the number of physical blocks needed to write the logical block to disk is determined (using the methods described in FIGS. 4-5 above) (Step 602). Subsequently, the number of parity blocks necessary to write the data to disk using the modified RAID scheme is determined (Step 604). In one embodiment of the invention, the number of parity blocks that are needed is computed as a function of the number of disks in the storage pool and the number of physical blocks that are necessary to allocate for the logical block corresponding to the data that is to be written to the storage pool. More specifically, the number of disks in the storage pool across which data is striped determines how often to insert parity blocks when writing data (as shown in the example of FIG. 7 below).

In one embodiment of the invention, the number of parity blocks needed for a given file or set of blocks depends on the physical size of the data to be written to disk and the number of disks in the storage pool used for striping data. For example, if 5 disks are used in the storage pool across which data is striped, then a parity block is computed at least once for every four data blocks written to disk. Thus, if the total physical size of the data is, e.g., 3K (i.e., 6 physical blocks of data), then two parity blocks are also written to disk along with the data.

Continuing with the discussion of FIG. 6, at this stage, the total number of physical blocks to allocate on disk is computed using the number of physical blocks required to store the data corresponding to the logical block and the number of parity blocks (as determined in Steps 602-604 above) (Step 606). Using the above example, for a 3K logical block, eight physical blocks are allocated on disk to store the data using the modified RAID scheme (i.e., 6 data blocks and 2 parity blocks). Further, in one embodiment of the invention, if the computed number of blocks to allocate on disk is odd, then the number of allocated blocks may be rounded up to the next even number to avoid fragmentation of data. Subsequently, the parity blocks corresponding to the data blocks are generated (Step 608). That is, the content of the parity block(s) is calculated using, for example, an XOR function. Once the parity block(s) are computed, the data blocks and the parity blocks are written to disk (Step 610). In one embodiment of the invention, the data blocks and the parity blocks are spread across all the disks in the storage pool to ensure that a full stripe write is performed.

Those skilled in the art will appreciate that every write performed using the above modified RAID scheme is equivalent to a full stripe write because the data and parity block are written at the same time. Performing a full stripe write ensures that all the data corresponding to a parity block is written to disk. Said another way, if one of the multiple disks fails during the full stripe write operation, then none of the data blocks or the parity block is written to disk. Thus, portions of data cannot be lost in a manner that does not allow the data to be recoverable.

FIG. 7 shows an example of data replicated using the modified RAID scheme described in FIG. 6. Specifically, FIG. 7 shows five disks (i.e., Disk 1 (740A), Disk 2 (740B), Disk 3 (740C), Disk 4 (740D), Disk 5 (740E)) in the storage pool. Those skilled in the art will appreciate that the parity block for a given set of physical blocks may be written to any of the aforementioned disks. That is, the parity block may rotate amongst the multiple disks in the storage pool.

In FIG. 7, two blocks of data are stored namely, block A and block B, in accordance with one embodiment of the invention. Specifically, block A is divided in to two physical blocks ($A_0$ (702) and $A_1$ (704)). Further, a single parity block (A' (700)) is generated for block A using $A_0$ (702) and $A_1$ (704). As shown in FIG. 7, the parity block (A' (700)) is written to the storage pool first followed by the blocks that make up block A (i.e., $A_0$ (702) and $A_1$ (704)). In addition, as discussed in FIG. 5, the allocated blocks must be an even number, accordingly, because block A requires three physical blocks (i.e., $A_0$ (702), $A_1$ (704), and A' (700)) an additional padding block (i.e., $A_{FILL}$ (706)) must also be allocated.

Similar, block B is divided into six physical blocks (i.e., $B_0$ (710), $B_1$ (720), $B_2$ (712), $B_3$ (722), $B_4$ (714), $B_5$ (716)). Further, two parity blocks ($B'_0$ (708) and $B'_1$ (718)) are generated for the aforementioned physical blocks. Specifically, $B'_0$ (708) is generated using $B_0$ (710), $B_2$ (712), $B_4$ (714), $B_5$ (716) and $B'_1$ (718) is generated using $B_1$ (720) and $B_3$ (722). Note that the parity blocks (e.g., $B'_0$ (708)) for a given set of physical blocks (e.g., $B_0$ (710), $B_2$ (712), $B_4$ (714), $B_5$ (716)) does not need to be on the same row as the set of physical blocks. In one embodiment of the invention, all parity blocks for a given block (e.g., ($B'_0$ (708) and $B'_1$ (718)) are located on the same disk.

Those skilled in the art will appreciate that if a block of data requires only one physical block (i.e., the data is very small), then a copy of the single physical block must be stored to recover that data in the event that the single disk on which the data is written fails. That is, a single physical block must be mirrored to recover the contents of the physical block because data cannot be recovered using only a parity block corresponding to the single physical data block.

Those skilled in the art will appreciate that the modified RAID scheme explained above is made possible because the starting point and the physical size of each block are stored on a per-block basis. Said another way, the exact location within a stripe where each block starts and how many subsequent physical blocks correspond to that block is stored in a block pointer of a parent block that references the block. Because this information is readily available for each logical block that is written to disk, data that is written to disk using the modified RAID replication scheme can be easily retrieved. Further, storing the aforementioned information on a per-block basis prevents wasting space on disk because fixed block sizes do not have to be implemented when using the modified RAID replication scheme. Rather, variable block sizes can be used to write data.

Figure 8:
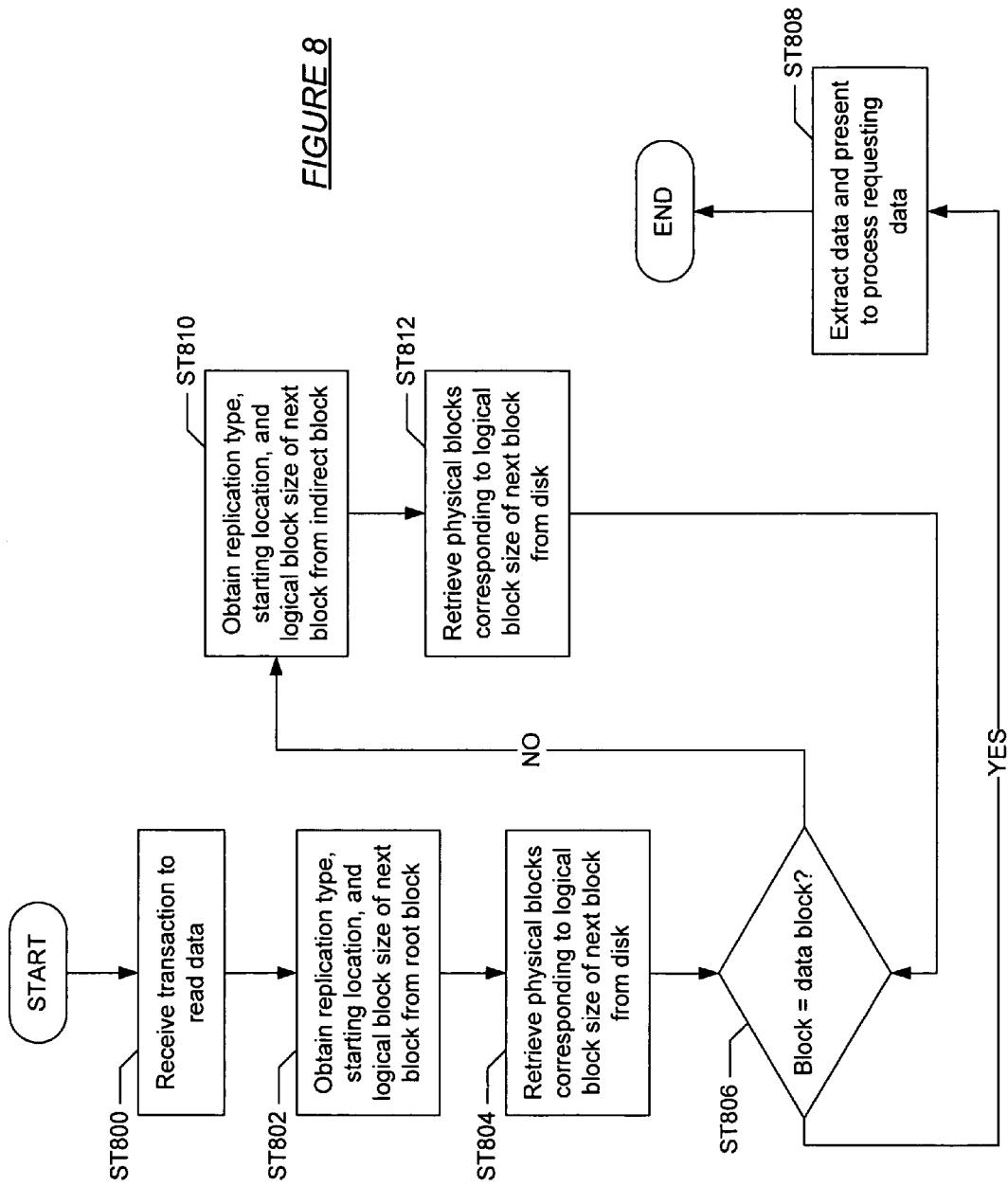
FIG. 8 shows a flow chart in accordance with an embodiment of the invention.

Although the aforementioned description of the invention has been focused on writing data using various types of replication policies, those skilled in the art will appreciate that the replication type and the number of blocks allocated to write data also affects the manner in which data is read and retrieved from disk. FIG. 8 shows a flow chart for reading data in accordance with one or more embodiments of the invention.

Initially, a transaction to read data is received (Step 800). Subsequently, the replication type, starting location (i.e., the metaslab ID and offset), and the logical block size of the next block is obtained from the root block (Step 802). That is, the block pointer of the root block is obtained and read to determine the location, size, and replication type of the block referenced by the root block. The logical block size stored in the block pointer of a block indicates the actual size of the data corresponding to the next block. In other words, because the logical block size of data may be different than the number of blocks allocated to store the data (i.e., due to the use of a replication policy to write the data), the logical block size is required to determine where the data stops on disk (i.e., how many blocks actually need to be retrieved beginning with the starting location of the block). Next, the physical blocks corresponding to the logical block of the next block are retrieved from disk (Step 804).

At this stage, a determination is made about whether the data retrieved corresponds to a data block (Step 806). If the data corresponds to a data block, then the data is extracted from the retrieved blocks and presented to the process requesting the data (Step 808). Alternatively, if the data does not correspond to a data block, then the retrieved blocks correspond to an indirect block. In this case, the replication type, starting location, and the logical block size of the next block is obtained from the block pointer in the indirect block (Step 810). Subsequently, the physical blocks corresponding to the logical block of the next block are retrieved from disk (Step 812). If the retrieved blocks correspond to a data block (Step 806), then the data is extracted and presented to the requesting process (Step 808). If the retrieved blocks do not correspond to a data block, then Steps 806-812 are repeated until the data block is encountered.

Those skilled in the art will appreciate that if a given physical block is corrupted or the disk, upon which the physical block is stored, failed or is offline, then the parity bit associated with the physical blocks may be used to recover the unavailable physical block.

Using the aforementioned method for reading data stored using a replication policy, data written to disk using a modified RAID scheme would include an indication in all corresponding parent blocks that the replication type is the modified RAID scheme. In this scenario, the logical block size that is obtained in Step 802 includes only the blocks that contain the actual data that a requesting process is interested in, and excludes the parity blocks allocated for the modified RAID replication scheme. Said another way, because the replication policy used to replicate particular data is stored in the parent block's block pointer, the blocks containing actual data can be isolated and retrieved for the requested process.

Figure 9:
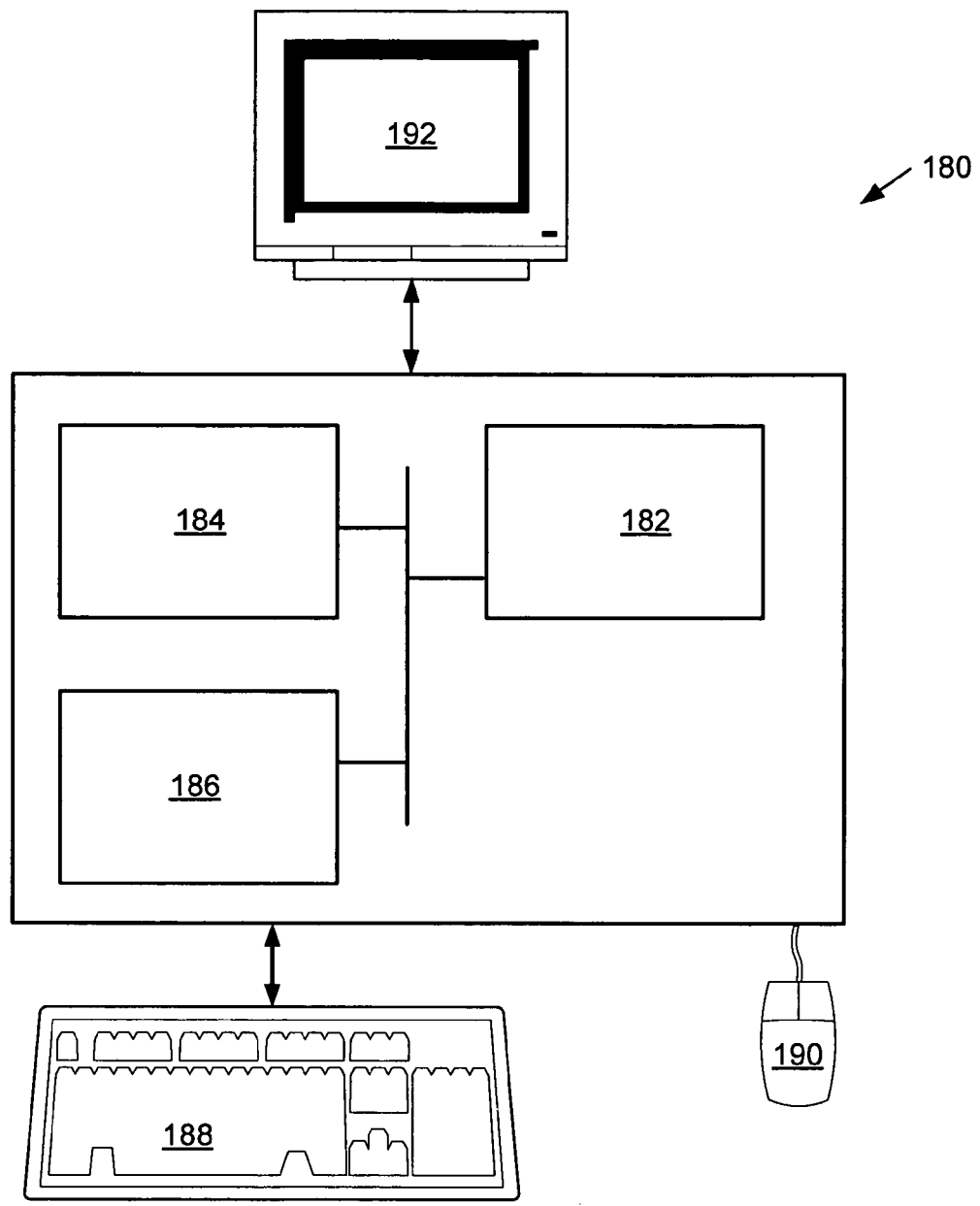
FIG. 9 shows a computer system in accordance with an embodiment of the invention.

The invention may be implemented on virtually any type of computer regardless of the platform being used. For example, as shown in FIG. 9 a networked computer system (180) includes a processor (182), associated memory (184), a storage device (186), and numerous other elements and functionalities typical of today's computers (not shown). The networked computer system (180) may also include input means, such as a keyboard (188) and a mouse (190), and output means, such as a monitor (192). The networked computer system (180) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (180) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for writing data to a storage pool, comprising:
   receiving a write operation to write a logical block of data to the storage pool;
   determining a number (n–1) of physical blocks required to store the logical block of data;
   generating a parity block using the logical block of data;
   allocating n physical blocks in the storage pool;
   writing the parity block in the first of n allocated physical block; and
   writing the logical block of data across the remaining n–1 allocated physical blocks,
   wherein n is less than a number of disks in the storage pool, and
   wherein each of the n allocated physical blocks is located on a different disk in the storage pool.

2. The method of claim 1, wherein the logical block is an indirect block.

3. The method of claim 1, wherein a size of the logical block is stored in a pointer referencing the logical block.

4. The method of claim 1, wherein the logical block is associated with a file in the file system.

5. A method for writing data to a storage pool, comprising:
   receiving a write operation to write a logical block of data to the storage pool;
   determining a number (n) of physical blocks required to store the logical block of data;
   dividing the logical block of data into n blocks;
   generating a first parity block using d–1 blocks, wherein d corresponds to a number of disks in the storage pool;
   generating a second parity block using n–d+1 blocks, wherein the n–d+1 blocks were not used to generate the first parity block;
   allocating n+2 physical blocks in the storage pool;
   writing the first parity block and the second parity block to a first of d disks in the storage pool; and
   writing the n blocks across the remaining d–1 in the storage pool,
   wherein at most two of the n blocks is written to any of the d–1 disks in the storage pool, and
   wherein d is less than n+2.

6. The method of claim 5, wherein the logical block is an indirect block.

7. The method of claim 5, wherein a size of the logical block is stored in a pointer referencing the logical block.

8. The method of claim 5, wherein the logical block is associated with a file in the file system.

9. A system, comprising:
   a storage pool comprising a number of disks (d); and
   a file system comprising functionality to:
      receive a write operation to write a logical block of data to the storage pool;
      determine a number (n–1) of physical blocks required to store the logical block of data;

generate a parity block using the logical block of data;
allocate n physical blocks in the storage pool;
write the parity block in the first of n allocated physical block; and
write the logical block of data across the remaining n−1 allocated physical blocks,
wherein n is less than d, and
wherein each of the n allocated physical blocks is located on a different disk in the storage pool.

10. The system of claim 9, wherein the logical block is an indirect block.

11. The system of claim 9, wherein a size of the logical block is stored in a pointer referencing the logical block.

12. The system of claim 9, wherein the logical block is associated with a file in the file system.

* * * * *

UNITED STATES PATENT AND TRADEMARK OFFICE
CERTIFICATE OF CORRECTION

PATENT NO. : 7,596,739 B2
APPLICATION NO. : 11/434296
DATED : September 29, 2009
INVENTOR(S) : Moore et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this

Twenty-eighth Day of September, 2010

David J. Kappos
*Director of the United States Patent and Trademark Office*